March 3, 1959     O. H. BANKER     2,875,774
UNLOADER VALVE

Filed May 23, 1955     2 Sheets-Sheet 1

INVENTOR.
Oscar H. Banker
BY
Charles P. Vrytech
Attorney

March 3, 1959
O. H. BANKER
2,875,774
UNLOADER VALVE
Filed May 23, 1955
2 Sheets-Sheet 2
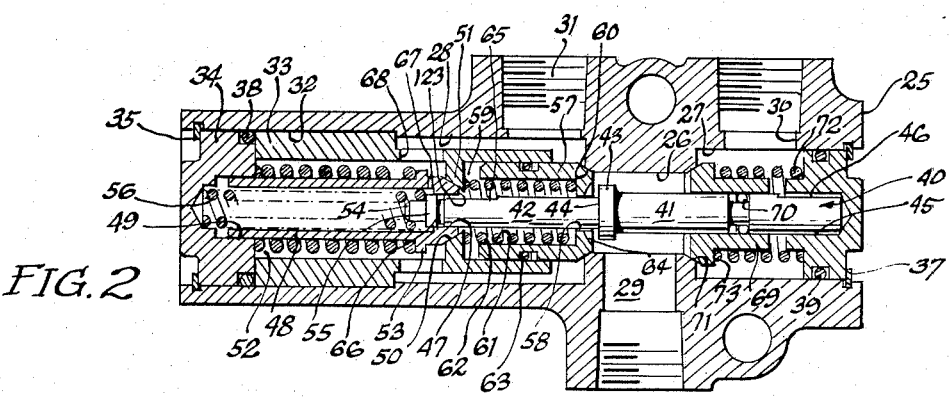
FIG. 2
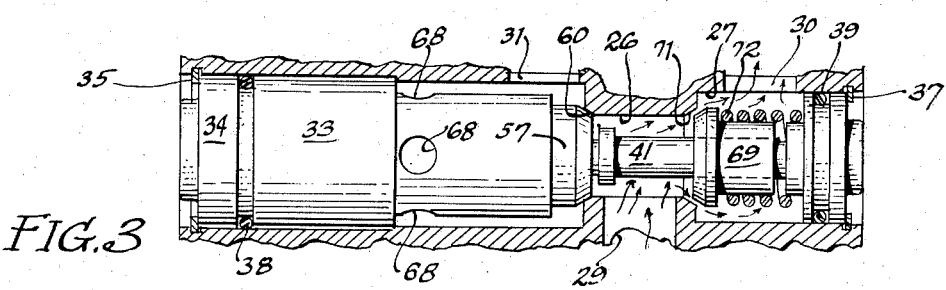
FIG. 3
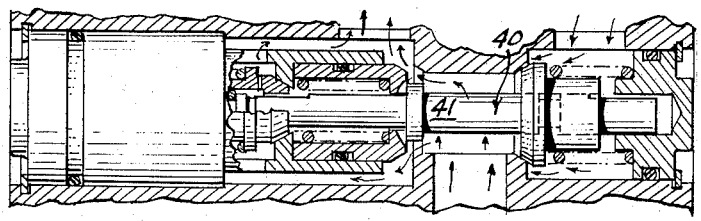
FIG. 4
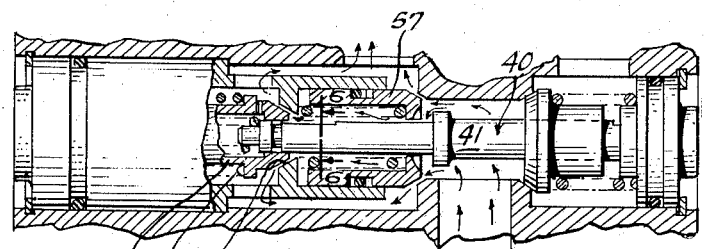
FIG. 5
FIG. 6
INVENTOR.
Oscar H. Banker
BY
Charles P. Vrtech
Attorney

United States Patent Office 2,875,774
Patented Mar. 3, 1959

2,875,774

UNLOADER VALVE

Oscar H. Banker, Evanston, Ill., assignor to New Products Corporation, Skokie, Ill., a corporation of Delaware Application May 23, 1955, Serial No. 510,105

11 Claims. (Cl. 137—108)

This invention relates to an unloader valve for a hydraulic system equipped with an accumulator.

Since the working part of a hydraulic system is generally operated intermittently, whereas the pump supplying the fluid under pressure for the system is operated continuously, it frequently happens that the pump is operated a great deal of the time without doing any useful work. If the system is not equipped with an accumulator, not only is the pump operated for relatively long periods without doing any useful work, but its capacity must be large enough to take care of peak loads. This requires an excessive amount of power to be used for the system, which increases the cost of both the initial installation and its operation.

Where an accumulator is used, the pump size may be decreased considerably, since peak loads may be accommodated from the accumulator, and the pump may be performing useful work while it is filling the accumulator even though the work load during the accumulating period has dropped considerably. Even with an accumulator, however, the pump may still be called upon to work against a load when the accumulator is full if the system is equipped merely with a relief valve which maintains the pressure in the output side of the pump at the maximum desired pressure at all times. To reduce the load on the pump still further during such period when the accumulator is filled, it is desirable to use an unloader valve the function of which is to shut off the accumulator from the pump and thereby to permit the pump output to be vented completely. Under these conditions the pump is operating against substantially no load.

The unloader valves presently in use employ a pilot valve which is operated from the pressure in the accumulator to shut off the output of the pump from the accumulator. Such pilot valves usually employ a small spring to hold them in open position in readiness for a refilling or charging of the accumulator and upon closing of the pilot valve the spring is so arranged that the pump is working against the pilot valve spring pressure when the pump is being unloaded by the unloader valve.

It is therefore one of the objects of this invention to provide an unloader valve for a hydraulic system using an accumulator in which the pump is not required to operate against any spring pressure while the accumulator is satisfied, thereby increasing the efficiency of the system.

Another defect inherent in most of the unloader valves of which I am aware resides in the complicated nature of the construction of such valves. Thus separate bores may be provided for each of the valves cooperating to produce an unloading function, each bore requiring separate machining operations and the drilling of connection passageways between the various valves.

As another object, therefore, this invention seeks to provide an unloader valve construction including a pilot valve, an accumulator check valve, an unloading valve and a relief valve, all of which are concentrically arranged and of such shape as to be readily produced by screw machine methods.

In yet another proposed form of unloader valve the accumulator check valve and the unloader valve are formed as a single solid spool which requires great accuracy in the machining of the spool and the seats for the unloader and accumulator valves to produce a satisfactory operation of the unloader valve.

It is a further object of this invention to provide an unloader valve including a pilot valve and an accumulator check valve, an unloader valve and a relief valve all of which operate as separate and distinct valves independently of one another so that no great accuracy is required in locating the seats of these valves.

Among the features of this invention are a dashpot action for the unloader valve which prevents the creation of sudden surge pressures when the unloader valve opens, and the freedom to design an unloader valve very simply for any desired differential between the pressures at which the unloader valve is opened and closed, that is, between the maximum and minimum pressures desired in the accumulator.

These and other objects and features of this invention will become apparent from the following detailed description when taken together with the accompanying drawings in which:

Fig. 2 is a cross section through a form of the unloader valve of this invention wherein the relief valve is concentrically arranged with respect to the unloader and pilot valves;

Figs. 3, 4 and 5 are views corresponding to Fig. 1 showing the various component valves of the unloader valve in different stages of operation;

Fig. 6 is a transverse section taken along line 6—6 of Fig. 5; and

Throughout the description to follow, the term "unloader valve" is sometimes used in its popular sense to refer to the housing for the unloader valve and the valves therein, and sometimes to the specific valve which performs the unloading function. It is believed that the meaning will nevertheless be clear from the context in each case.

Figure 1:
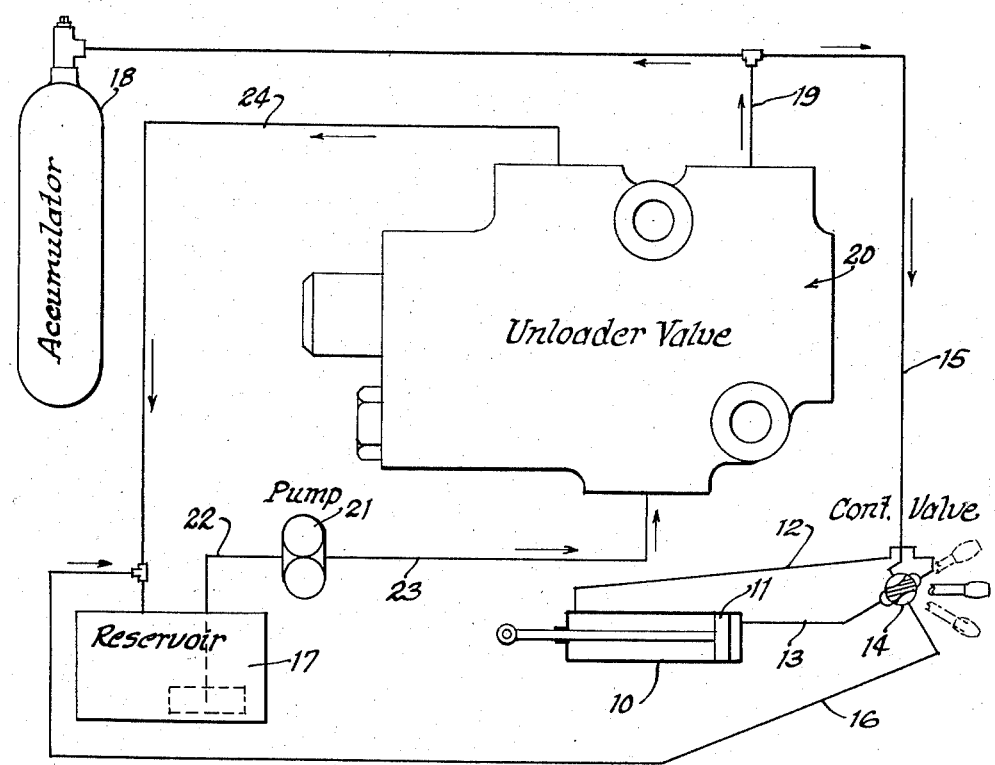
Fig. 1 is a schematic diagram of a hydraulic system utilizing an accumulator and an unloader valve made in accordance with this invention.

For a general description of a typical system using an unloader valve reference is now made to Fig. 1 wherein is shown a work cylinder 10 of any suitable nature including a piston 11 the opposite sides of which are connected by lines 12 and 13 to a control valve 14 which may be manually or automatically operable. Said valve 14 is adapted to connect lines 12 and 13 alternately to a high pressure line 15 and to a return or vent line 16 to reciprocate piston 11 in its cylinder 10 as desired. Vent line 16 empties into a reservoir 17, and high pressure line 15 is connected to an accumulator 18 and to the output side 19 of the valve 20 of this invention shown in outline in combination with certain other valves hereinafter to be described.

A pump 21 of any suitable character is adapted to be driven continuously from a source of power (not shown) and has an intake line 22 leading from sump 17 and a high pressure outlet line 23 connecting the output of the pump to the valve 20. The fluid unloaded by the unloader valve is returned to reservoir 17 by a line 24.

In the form shown in Fig. 2, the unloader valve is disposed in a valve block 25 having a central opening or chamber 26, and concentric counterbores or enlarged chambers 27 and 28 on either side thereof. Chamber 26 is connected by a side opening 29 to line 23 coming from pump 21, chamber 27 is connected through a side opening 30 to line 19 leading to accumulator 18 and control valve 14, and chamber 28 is connected by a side opening 31 to line 24 which, it may be recalled, is the return line to the sump. Adjacent chamber 28 is a step 32 in which are received a sleeve 33 and a plug 34, the latter being retained in the step 32 by a snap ring 35. A similar plug 36 closes off chamber 27 and is retained in said chamber by a snap ring 37. Suitable O-ring seals 38 and 39 are used to effect a fluid-tight seal between plugs 34, 36 and their respective step 32 and chamber 27.

Extending through all three chambers 26, 27 and 28 is a pilot valve 40 of cylindrical form and having its right-hand portion 41, as viewed in Figs. 2 to 5, of slightly greater diameter than its left-hand portion 42. The region 43, intermediate regions 41 and 42 is enlarged to form a shoulder 44, the function of which will be described hereinafter. The right-hand end of valve 40 is slidably supported in a recess 45 formed in plug 36, said end having a flat 46 formed in the side thereof of greater axial length than the depth of recess 45 to provide a passageway by which fluid in chamber 27 may enter the bottom of recess 45 and act against the said end of valve 40.

The left-hand end of valve 40 as viewed in Fig. 2 is received in an opening 47 in a relief valve 48, slidably supported at one end in a recess 49 formed in plug 34. Valve 48 is continuously urged against a seat 50, formed in an apertured, radially inwardly extending wall 51 in sleeve 33, by a coil spring 52, said spring surrounding valve 48 and acting at one end against plug 34 and at its opposite end against a radially extending flange 53 on valve 48.

The left-hand portion 42 of valve 40 has a still further reduction in diameter in the end 54 thereof to form a shoulder 55 against which a spring 56, disposed within valve 48, may act, said spring encircling end 54 and being centered thereby. The opposite end of spring 56 abuts on the bottom of recess 49 in plug 34. Thus spring 56 continually urges pilot valve 40 to the right as viewed in Fig. 2 and holds end 41 thereof against the bottom of recess 45 in plug 36.

Within sleeve 33 and to the right of wall 51 as viewed in Fig. 2 is disposed an unloader valve 57, said unloader valve having an opening 58 through which pilot valve portion 42 extends, said opening 58 being larger than portion 42 to provide a passageway therebetween through which fluid from chamber 26 may pass to the interior of valve 57 as well as into the space 59 between the left-hand end of valve 57 as viewed in Fig. 2 and wall 51.

The corner formed between chambers 26 and 28 in valve block 25 is chamfered to form a conical seat 60 for valve 57. Opening 58 in valve 57 is enlarged at 61 to provide space for a spring 62 which is compressed between the forward part of valve 57 and wall 51, thus continuously to urge valve 57 against seat 60. It may be observed that the pressure of spring 62 is augmented by the pressure of fluid entering space 59 from chamber 26 through opening 58. Since the smallest diameter of seat 60 is less than the greatest diameter of space 59, the presence of fluid under pressure in space 59 creates a hydraulic unbalance in favor of closing valve 57. A suitable O-ring seal 63 may be provided between valve 57 and sleeve 33. It may be noted that opening 58 in valve 57 is of lesser diameter than the diameter of region 43 intermediate the right and left-hand portions 41 and 42 of valve 40. Should valve 40 be moved to the left as viewed in Fig. 2 a sufficient distance, the shoulder formed by region 43 will strike the right-hand end of valve 57 as viewed in Fig. 2, and, depending upon the pressure behind pilot valve 40, may or may not move unloader valve 57 with it off seat 60 to establish hydraulic communication between chamber 26 and chamber 28, thereby unloading or venting chamber 26. In order not to destroy the hydraulic communication between chamber 26 and the space around portion 42 within opening 58, two or more slots 64 may be milled radially across the right-hand face of valve 57 as viewed in Fig. 2, the slots being large enough to extend beyond the outer periphery of region 43.

Communication from space 59 to chamber 28 may be effected upon movement of valve 40 to the left as viewed in Fig. 2 through a flat 65 on the side of valve portion 42 which terminates in a peripheral groove 66 adapted to be aligned with a small cross bore 67 in relief valve 48, said cross bore 67 communicating with the space around valve 48 and, through large cross bores 68 in sleeve 33, with chamber 28. Said chamber 28, as previously described, is in communication through side opening 31 with the return line 24 which is at atmospheric pressure.

Disposed in chamber 27 and surrounding portion 41 of valve 40 is the accumulator check valve 69. The latter may be sealed with respect to pilot valve 40 by an O-ring seal 70. The corner of valve body 25 formed by chambers 26 and 27 is chamfered to form a seat 71 for valve 69, and said valve 69 is continuously urged against seat 71 by a spring 72 surrounding valve 69 and compressed between plug 36 and a shoulder 73 on valve 69.

The operation of the unloader and associated valves is as follows:

Referring now to Fig. 3, the valves referred to above are depicted in the position they occupy when the pressure in accumulator 18 has dropped below the cut-in value for the device. Under this condition unloader valve 57 is held against its seat 60 and pilot valve 40 occupies substantially the position shown in Fig. 2 wherein the right-hand end thereof abuts on the bottom of recess 45 in plug 36. Check valve 69, however, has been moved to the right as viewed in Fig. 3 off its seat 71, thereby allowing fluid from the pump in opening 29 and chamber 26 to pass into chamber 27 and out through opening 30 into line 19 and accumulator 18. Said fluid, of course, also passes into the space between flat 46 and recess 45 around the right-hand end of valve 40 as viewed in Fig. 2 so that whatever pressure obtains in chamber 27 is also exerted against that end of pilot valve 40.

When the pressure against the right-hand end of pilot valve 40 as viewed in Fig. 2 exceeds the pressure exerted thereagainst by spring 56 together with the fluid pressure against that portion of the shoulder formed by portion 43 represented by the difference in area between the area of the portion 41 and area of the portion 42 of valve 40, said valve 40 will move to the left and assume the position shown in Fig. 4. In so moving, peripheral groove 66 first establishes communication with the interior of relief valve 48 and through said interior with cross bores 67, the exterior of valve 48, cross bores 68 and chamber 28 to the return passage 24. This vents space 59 to enable unloader valve 57 to move to the left under the continuing pressure of portion 43. The venting of space 59, however, is accomplished slowly due to the small size of bore 67 so that a slight dash-pot action is produced to prevent the creation of hydraulic surge forces in the system by the rapid opening of unloader valve 57. With the reduction in pressure created in chamber 26 by the opening of valve 57, the pressure in chamber 27 together with the pressure of spring 72 effects a closing of accumulator check valve 69, so that whatever pressure exists in the accumulator at the time of closing will remain substantially constant unless depleted by an operation of the piston 11 or leaks in the system.

Inasmuch as pilot valve 40 is held against its spring 56 by the pressure of the fluid in the accumulator, and inasmuch as such pressure is also sufficient to hold unloader valve 57 in its open position as shown in Fig. 4, pump 21 operates against substantially zero pressure, neglecting friction losses in the lines from the pump back to the reservoir 17, and hence is using substantially no power while the hydraulic system is working on the accumulator or is at rest. The condition shown in Fig. 4 will obtain until the pressure behind pilot valve 40 drops below the pressure provided by spring 56, whereupon valve 40 will be moved to the right as viewed in Fig. 4 by said spring to the position shown in Fig. 2. During such movement to the right, groove 66 will be blocked off from cross bore 68 by the passage of the end of region 42 into opening 47 in relief valve 48, and valve 57 will also move to the right and seat itself upon seat 60, thereby allowing pressure to build up behind said valve 57 in space 59 to hold the valve in closed position. With valve 57 closed, pressure will also build up in chamber 26 to a pressure sufficient to move accumulator check valve 69 to the right off its seat 71 and against the action of spring 72 to open communication between chamber 26 and chamber 27. Full pump pressure may then be developed to charge accumulator 18 to the desired pressure, whereupon the unloading cycle previously described will be repeated.

In the event that pilot valve 40 should stick, or for any other reason fail to move at its designed unloading pressure, the condition of the valves will be substantially that shown in Fig. 5. It may be noted that even though valve 40 has not moved, fluid pressure acting upon the forward surface 123 of relief valve 48 in opposition to its spring 52 will become sufficiently great to overcome said spring 52 and move valve 48 off its seat 50. This establishes communication from chamber 26 through opening 58 around portion 42 of pilot valve 40 and space 59 behind unloader valve 57, and then across seat 50 into the space around relief valve 48 and into cross bores 68 and chamber 28. The reduction in pressure in space 59 will enable unloader valve 57 to unseat itself slightly thereby still further relieving the pressure in chamber 26.

The increase in pressure in chamber 26 before the opening of relief valve 48 may be accompanied by a slight opening of accumulator check valve 69 until the maximum pressure in chamber 26 is reached, whereupon valve 69 will close as shown in Fig. 5 because of the action of spring 72 which acts in addition to the pressure in chamber 27 to assist in holding the valve in closed position.

Figure 7:
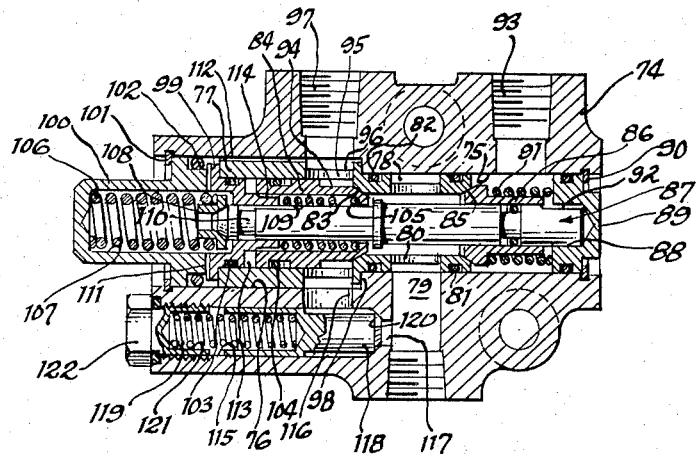
Fig. 7 is a section taken through the unloader valve of Fig. 1 wherein the relief valve is disposed to one side of the unloader valve.

The form of valve shown in Fig. 7 is similar to the form shown in Fig. 2 insofar as the principle of operation is concerned, but it is structurally more compact and involves simpler machining operations in that the seats for the unloading and accumulator check valves are formed in an insert rather than in the valve body casting itself. In the Fig. 7 form, valve block 74 has a bore 75 therein which is enlarged at its left-hand end 76 to receive a sleeve insert 77. Said insert 77 is stepped and extends into bore 75. It is provided with a peripheral groove 78 in axial alignment with an inlet opening 79 in communication with the pump output line 23. Cross bores 80 in sleeve 77 establish communication between groove 78 and the interior of the sleeve so that said interior is at all times at pump pressure. The sleeve is sealed with respect to bore 75 on either side of groove 78 by O-ring seals 81 and 82.

A seat 83 is formed in the interior of sleeve 77 for an unloader valve 84, and a similar seat 85 is provided in the right-hand end of sleeve 77 as viewed in Fig. 7 for an accumulator check valve 86.

As in the Fig. 2 form, a pilot valve 87 extends through unloader valve 84 and check valve 86 into a recess 88 formed in a plug 89 disposed in the right-hand end of bore 75 and held therein by a snap ring 90. A spring 91 is compressed between plug 89 and a shoulder formed on the forward or left-hand end of valve 86 as viewed in Fig. 7 and serves to urge valve 86 continuously against seat 85. A flat 92 machined in the side of pilot valve 87 at the right-hand end thereof as viewed in Fig. 7 establishes communication between the exterior of valve 86 and the said end of pilot valve 87. The exterior of valve 86 is in substantial axial alignment with an opening 93 which may be connected to line 19 leading to accumulator 18.

Unloader valve 84 has a region of reduced diameter 94 in axial alignment with cross bores 95 opening upon a peripheral groove 96 formed in sleeve 77. Thus when valve 84 is moved to the left off its seat 83, fluid may flow from the interior of that portion of sleeve 77 which is in axial alignment with cross bores 80 past seat 83, around the reduced portion 94 of valve 84 through cross bores 95 and around groove 96 into an opening 87 in valve block 74 connected to line 24 leading to reservoir 17 and constituting the vent or return line for the system.

Sleeve 77 is held in place axially by an abutment 98 on one side and by an insert 99 backed by a cap 100 retained in bore 76 by a snap ring 101, suitable O-rings 102, 103 and 104 providing effective seals respectively between cap 100 and bore 76, between insert 99 and the interior of sleeve 77, and lastly, between unloader valve 84 and the interior of sleeve 77.

A spring 105 is compressed between insert 99 and an abutment on the interior of valve 84 and tends continuously to hold said valve against seat 83. A spring 106 disposed in a recess 107 in cap 100 and bearing against an adapter 108 mounted on the left-hand end of pilot valve 87 as viewed in Fig. 7 serves continuously to urge said pilot valve to the right as viewed in that figure. As in the Fig. 2 design, pilot valve 87 is formed with a flat 109 on one side thereof communicating with a peripheral groove 110 which, when valve 87 is moved to the left as viewed in Fig. 7, establishes communication to the interior of cap 100 and thence through radial grooves 111 formed in the end of insert 99 to the exterior of said insert. A groove 112 cut axially in the exterior surface of sleeve 77 conducts the fluid from the exterior of insert 99 to opening 97 and thence to the return line 24.

It may be noted that a space 113 is formed between the left-hand end of valve 84 as viewed in Fig. 7, and insert 99, and that insert 99 has a region of reduced diameter 114 adjacent said space. It is contemplated that said space 113 when filled with fluid from the interior of valve 84 will provide a more pronounced dash-pot action than in the Fig. 2 form, the fluid trapped in space 113 being forced into the space formed between region of reduced diameter 114 and the interior of valve 84 and thence around the end of insert 99 through flat 109 around groove 110 into cap 100, along radial grooves 111 and axial groove 112 into the opening 97.

The relief valve in Fig. 7, instead of being aligned, or concentrically arranged, with respect to pilot valve 87, is disposed in a separate bore 115 in valve block 74. Bore 115 is in communication with peripheral groove 96 through an opening 116 connecting bore 115 with bore 76 and disposed in axial alignment with said groove 96. The right-hand end 117 of said bore as viewed in Fig. 7 is reduced and communicates with inlet opening 79 from pump 21 and line 23. A spring 119 holds relief valve 118 against a seat 120 formed in the zone between bore 115 and opening 117. The opposite end of spring 119 from seat 120 is received in a recess 121 formed in a screw 122 threaded into bore 115.

The operation of pilot valve 87 is precisely the same as in the Fig. 2 form, as is also the operation of check valve 86 and unloader valve 84. Similarly, relief valve 118 will operate to relieve the system of excessive pressure in the event pilot valve 87 for some reason fails to move at the designed accumulator pressure. The operation of these various valves therefore will not be repeated with reference to the Fig. 7 form. It may be noted, however, that with the greatly pronounced dash-pot action provided by the specific construction of the space 113 and the constricted passageway from said space to the exterior of the valve, a much quieter operation of the valve will result. It is understood that features in the Fig. 7 form not shown in the Fig. 2 form may be adapted therein without departing from the spirit of this invention.

It may be apparent that the unloader valve and its associated valves as illustrated in Fig. 2 and Fig. 7 and described above provides a compact, readily manufactured and assembled valve structure which may be made more economically than those heretofore proposed, but which nevertheless provides the functions of the pilot, check, unloader and relief valves. The independent action of each of the valves described herein renders unnecessary close machining tolerances in the valve seats and valves insofar as axial dimensions are concerned and makes it possible to dispense with the relief valve if desired.

It is understood that the foregoing description is merely illustrative of preferred embodiments of this invention and that the scope of the invention therefore it not to be limited thereto but is to be determined by the appended claims.

I claim:

1. An unloader valve for a hydraulic system including a reservoir, a pump and an accumulator, said unloader valve comprising a block having a through bore therein and three axially spaced side openings connecting with the through bore, the middle opening being connectible to the pump of the system and the other openings being connectible respectively to the accumulator and to the reservoir of the system, a pilot valve concentrically arranged in and with respect to said through bore, a check valve in hydraulic communication with the accumulator opening to limit the pressure in the accumulator opening, an unloader valve member concentrically arranged with respect to the pilot valve and interposed between the pump and reservoir openings, one end of the pilot valve being exposed to the fluid in the accumulator opening, said unloader valve member being exposed on opposite sides to pump pressure, one of said sides being of greater area than the other, and said unloader valve being hydraulically unbalanced thereby in a closing direction, resilient means opposing the accumulator pressure on the pilot valve, valve means on the pilot valve for unbalancing the unloader valve in an opening direction upon the attainment of an accumulator pressure on the pilot valve in excess of the spring pressure and a consequent movement of the pilot valve in opposition to the spring pressure, and means on the pilot valve adapted to engage and move the unloader valve upon the unbalancing of the unloader valve in an opening direction.

2. An unloader valve as described in claim 1, said check valve being concentrically arranged with respect to and slidable on said pilot valve.

3. An unloader valve as described in claim 1, said pilot valve having an area exposed to pump pressure and acting upon said pilot valve in a direction to augment the spring pressure thereon.

4. An unloader valve as described in claim 1, said means on the pilot valve adapted to engage and move the unloader valve comprising a shoulder on the pilot valve exposed to the fluid at pump pressure and providing pressure on said pilot valve acting in a direction to augment the spring pressure thereon.

5. An unloader valve as described in claim 1, said unloader valve being concentrically arranged with respect to said pilot valve and having an opening therein, said pilot valve extending into said unloader valve through said opening and being of a diameter slightly smaller than the diameter of said opening in said unloader valve whereby to admit fluid under pump pressure through said opening to the opposite side of said unloader valve, an abutment in the bore, and resilient means compressed between the abutment and the unloader valve and acting in a direction to close said valve.

6. An unloader valve as described in claim 1, a sleeve in said bore adapted to receive the unloader valve with a sliding fluid-tight fit, an abutment in said sleeve extending radially inwardly thereof and having a valve seat on the radially inner end thereof, a pressure relief valve adapted to seat upon said seat, said pressure relief valve having a central opening therein to receive the pilot valve with a sliding substantially fluid-tight fit, said valve means on the pilot valve being disposed within the pressure relief valve, and an opening in the pressure relief valve adapted to be aligned with the valve means on the pilot valve to permit the escape of fluid from behind the unloader valve through said opening, and means for conducting fluid from said opening in the relief valve to the reservoir opening.

7. An unloader valve as described in claim 1, a sleeve in said bore adapted to receive the unloader valve with a sliding fluid-tight fit, an abutment in said sleeve extending radially inwardly thereof and having a valve seat on the radially inner end thereof, a pressure relief valve adapted to seat upon said seat, said pressure relief valve having a central opening therein to receive the pilot valve with a sliding substantially fluid-tight fit, said valve means on the pilot valve being disposed within the pressure relief valve, and an opening in the pressure relief valve adapted to be aligned with the valve means on the pilot valve to permit the escape of fluid from behind the unloader valve through said opening, means for conducting fluid from said opening in the relief valve to the reservoir opening, said seat for the pressure relief valve being of greater diameter than the diameter of the opening therein to receive the pilot valve, whereby to expose an area of the relief valve to the fluid under pressure from the pump, and resilient means opposing such fluid pressure upon the relief valve, whereby pressure exerted upon the relief valve by the fluid under pressure may open the relief valve when the fluid pressure exceeds the pressure exerted by the resilient means upon the pressure relief valve.

8. An unloader valve as described in claim 1, a cap closing the through bore and having a recess therein to receive the pilot valve, said pilot valve having a relieved area on the side thereof in communication with the accumulator opening and extending to the end of the pilot valve in the recess to admit fluid under pressure from said accumulator opening behind the said end of the pilot valve in the cap.

9. An unloader valve as described in claim 1, a sleeve in said bore, said sleeve having seats formed thereon for the check valve and the unloader valve, said unloader valve being concentrically arranged and slidable upon the pilot valve, and a spring urging said check valve against the seat provided therefor on said sleeve.

10. An unloader valve as described in claim 1, a sleeve in said bore adapted to receive on the interior thereof said unloader valve, an insert partially closing said sleeve and surrounding the pilot valve with a fluid-tight fit, said insert having a sleeve-like portion adapted to fit between the pilot valve and the interior of the unloader valve, said fit being progressively close as the unloader valve moves toward the insert whereby fluid trapped between the unloader valve and insert escapes slowly from between the insert and interior of the unloader valve, thereby to function as a dash-pot for the opening of the unloader valve.

11. An unloader valve as described in claim 1, a sleeve in said bore adapted to receive on the interior thereof said unloader valve, an insert partially closing said sleeve and surrounding the pilot valve with a fluid-tight fit, said insert having a sleeve-like portion adapted to fit between the pilot valve and the interior of the unloader valve, said fit being progressively close as the unloader valve moves toward the insert whereby fluid trapped between the unloader valve and insert escapes slowly from between the insert and interior of the unloader valve, thereby to function as a dash-pot for the opening of the unloader valve, said valve means on the pilot valve becoming effective to unbalance the unloader valve prior to the movement of the unloader valve by the pilot valve, whereby to provide an outlet for the fluid trapped between the insert and the unloader valve after said fluid is released.

References Cited in the file of this patent

UNITED STATES PATENTS

| | | |
|---|---|---|
| 2,404,102 | Schultz | July 16, 1946 |
| 2,545,712 | Stevenson | Mar. 20, 1951 |
| 2,647,530 | Jaquith | Aug. 4, 1953 |